US007324642B2

(12) United States Patent
Pletikosa

(10) Patent No.: US 7,324,642 B2
(45) Date of Patent: *Jan. 29, 2008

(54) MOBILE DEVICE HAVING A PROTECTIVE USER INTERFACE COVER

(75) Inventor: Velimir Pletikosa, Kitchener (CA)

(73) Assignee: Research In Motion Limited, Waterloo (CA)

( * ) Notice: Subject to any disclaimer, the term of this patent is extended or adjusted under 35 U.S.C. 154(b) by 0 days.

This patent is subject to a terminal disclaimer.

(21) Appl. No.: 11/701,048

(22) Filed: Feb. 1, 2007

(65) Prior Publication Data

US 2007/0135184 A1 Jun. 14, 2007

Related U.S. Application Data

(63) Continuation of application No. 11/437,049, filed on May 19, 2006, now Pat. No. 7,194,086, which is a continuation of application No. 10/010,341, filed on Dec. 5, 2001, now Pat. No. 7,054,441.

(60) Provisional application No. 60/254,955, filed on Dec. 12, 2000.

(51) Int. Cl.
*H04M 1/00* (2006.01)
*H05K 5/03* (2006.01)

(52) U.S. Cl. ............ 379/433.12; 361/681; 379/433.13; 455/575.3; 455/90.3

(58) Field of Classification Search ................ 361/681; 379/433.12, 433.13; 455/575.3, 575.4, 90.1, 455/90.3, 418
See application file for complete search history.

(56) References Cited

U.S. PATENT DOCUMENTS 5,185,790 A 2/1993 Mischneko

| 5,410,447 A | 4/1995 | Miyagawa et al. |
| 5,638,441 A | 6/1997 | Hattori et al. |
| 5,732,331 A | 3/1998 | Harms |
| 5,911,121 A | 6/1999 | Andrews |
| 6,415,138 B2 | 7/2002 | Sirola et al. |

(Continued)

FOREIGN PATENT DOCUMENTS

| EP | 0 969 641 A1 | 1/2000 |
| JP | 11-215022 | 8/1999 |

(Continued)

*Primary Examiner*—Harry S. Hong
(74) *Attorney, Agent, or Firm*—Jones Day; Krishna K. Pathiyal; Robert C. Liang

(57) ABSTRACT

A mobile device having a protective user interface cover is provided. The mobile device includes a mobile device housing having a top surface. The user interface is preferably mounted within the top surface of the mobile device, and may include a display, a keyboard, a touch screen, a touch surface, or any other type of user input and display apparatus. The protective cover comprises a protective surface and a positioning mechanism, wherein the protective cover is mounted to the mobile device housing such that the positioning mechanism positions the protective surface between a first position in which the protective surface covers the user interface in the top surface and a second position in which the protective surface does not cover the user interface in the top surface. The protective surface may include a plurality of apertures for receiving user input while the protective cover is in the first position, and may also be at least partially transparent so that a display is visible while the protective cover is in the first position.

18 Claims, 10 Drawing Sheets

U.S. PATENT DOCUMENTS 6,489,949 B1 *  12/2002  Yin ........................... 345/168
7,054,441 B2    5/2006   Pletikosa
7,194,086 B2 *  3/2007   Pletikosa ............... 379/433.12

FOREIGN PATENT DOCUMENTS

WO    WO 99/21343  A1    4/1999
WO    WO 03/021922 A1    3/2003

* cited by examiner

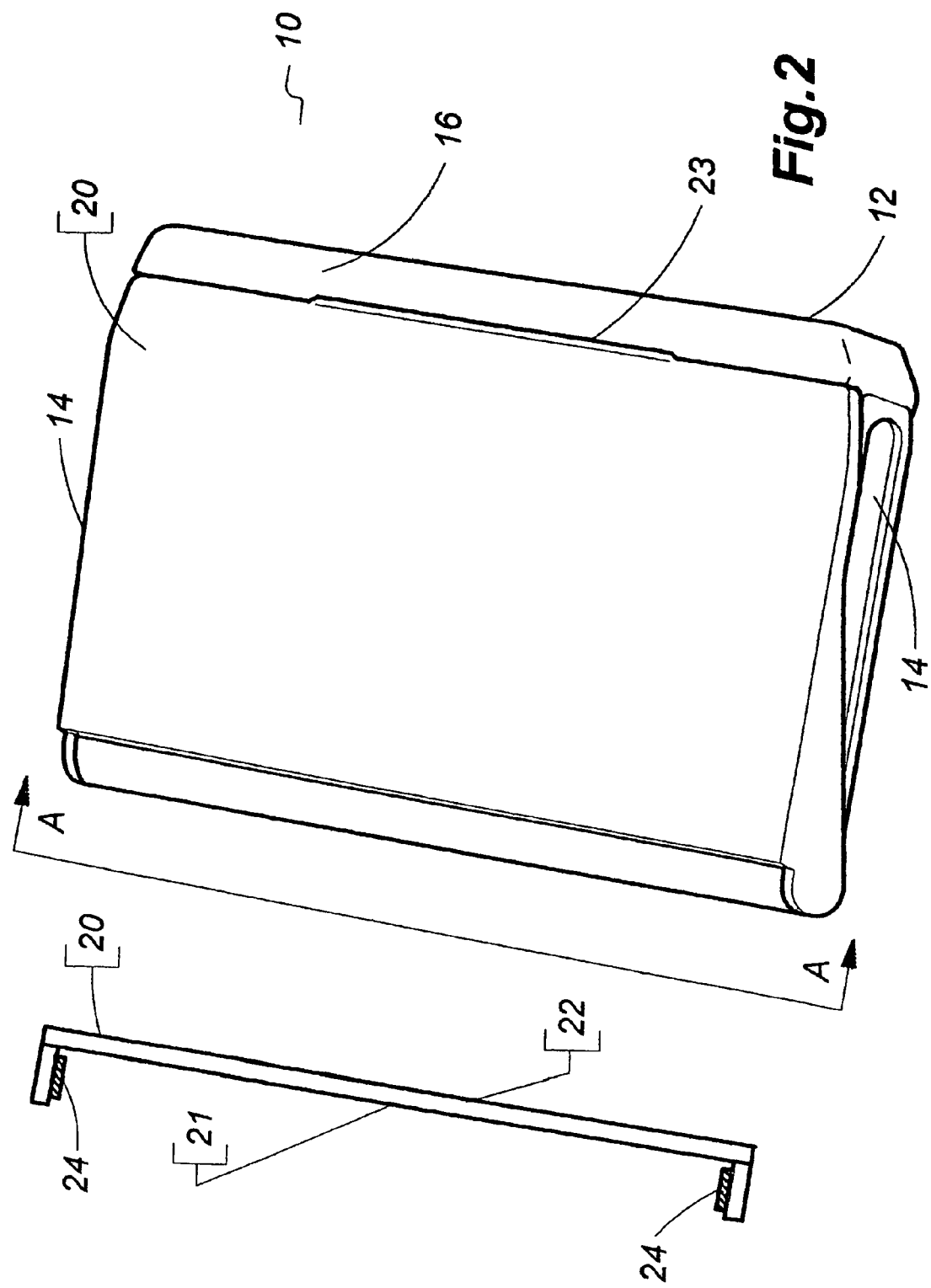

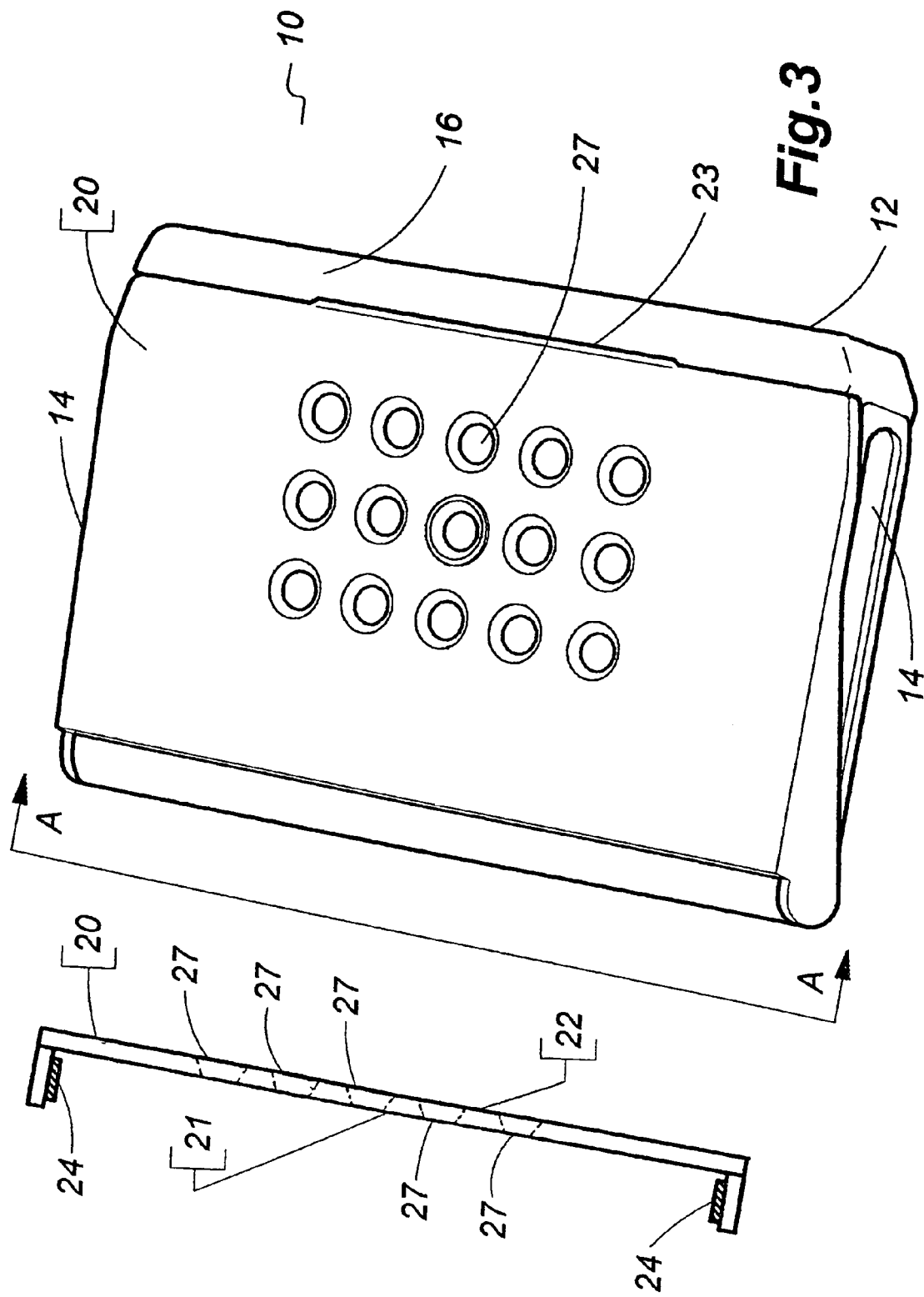

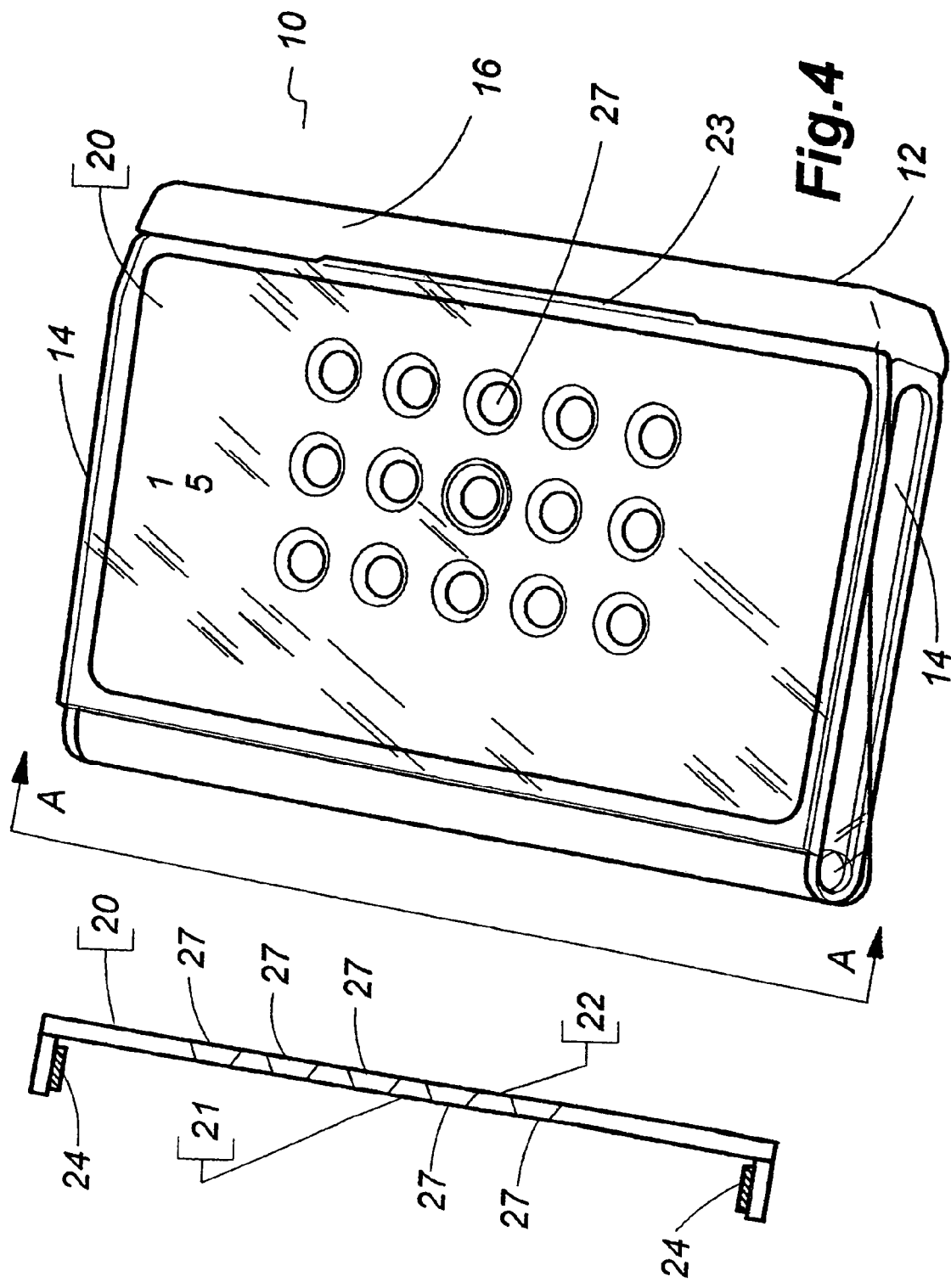

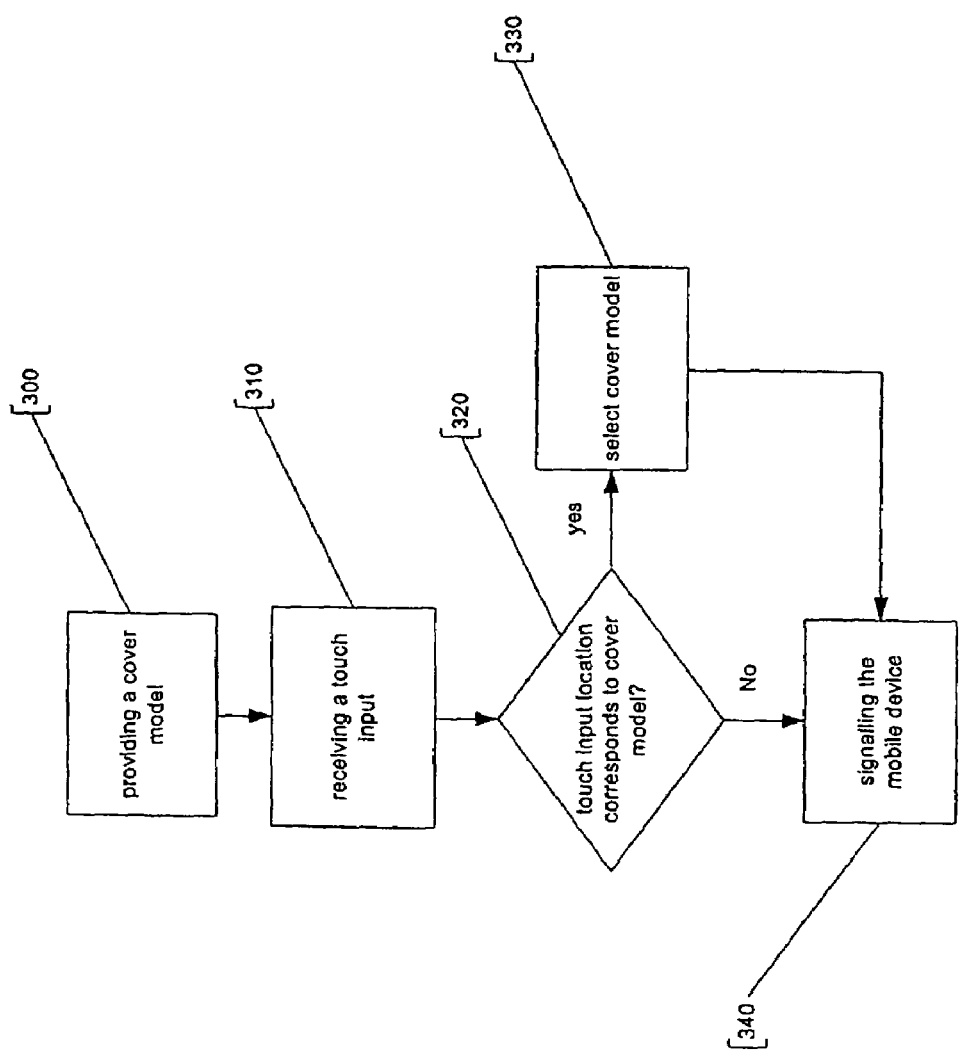

MOBILE DEVICE HAVING A PROTECTIVE USER INTERFACE COVER

CROSS-REFERENCE TO RELATED APPLICATION

This application is a continuation of U.S. Ser. No. 11/437,049, filed on May 19, 2006 now U.S. Pat. No. 7,194,086, which is a continuation of U.S. Ser. No. 10/010,341, filed on Dec. 5, 2001, now U.S. Pat. No. 7,054,441, which claims priority from U.S. Provisional Application Ser. No. 60/254,955, titled "User Interface Cover Apparatus and Method for a Mobile Device," filed on Dec. 12, 2000. These prior applications are hereby incorporated into the present application by reference.

FIELD OF THE INVENTION

This application relates generally to mobile devices, such as cellular telephones, personal digital assistants, two-way pagers, voice/data communicators, and the like. More specifically, the application relates to a protective user interface cover for a mobile device.

DESCRIPTION OF THE RELATED ART

Protective covers for mobile devices are known. These covers typically take the form of a plastic or fabric pouch that is used to hold the mobile device, and which is used to protect the user interface from debris or damage. The primary drawback with these types of protective covers is that they must be removed from the mobile device in order to receive information from the mobile device, or to provide input commands or selections to the mobile device.

SUMMARY

A mobile device having a protective user interface cover is provided. The mobile device includes a mobile device housing having a top surface. The user interface is preferably mounted within the top surface of the mobile device, and may include a display, a keyboard, a touch screen, a touch surface, or any other type of user input and display apparatus. The protective cover comprises a protective surface and a positioning mechanism, wherein the protective cover is mounted to the mobile device housing such that the positioning mechanism positions the protective surface between a first position in which the protective surface covers the user interface in the top surface and a second position in which the protective surface does not cover the user interface in the top surface. The protective surface may include a plurality of apertures for receiving user input while the protective cover is in the first position, and may also be at least partially transparent so that a display is visible while the protective cover is in the first position.

BRIEF DESCRIPTION OF THE DRAWINGS

FIG. 2 depicts the typical mobile device of FIG. 1 configured with a protective user interface cover according to one embodiment of the present invention;

FIG. 3 depicts the typical mobile device of FIG. 1 configured with a protective user interface cover according to a second embodiment of the present invention;

FIG. 4 depicts the typical mobile device of FIG. 1 configured with a protective user interface cover according to a third embodiment of the present invention;

FIG. 8 is a flowchart describing a method of adapting a mobile device having a touch surface for use with a plurality of detachable and interchangeable protective user interface covers.

DETAILED DESCRIPTION OF THE DRAWINGS

Figure 1:
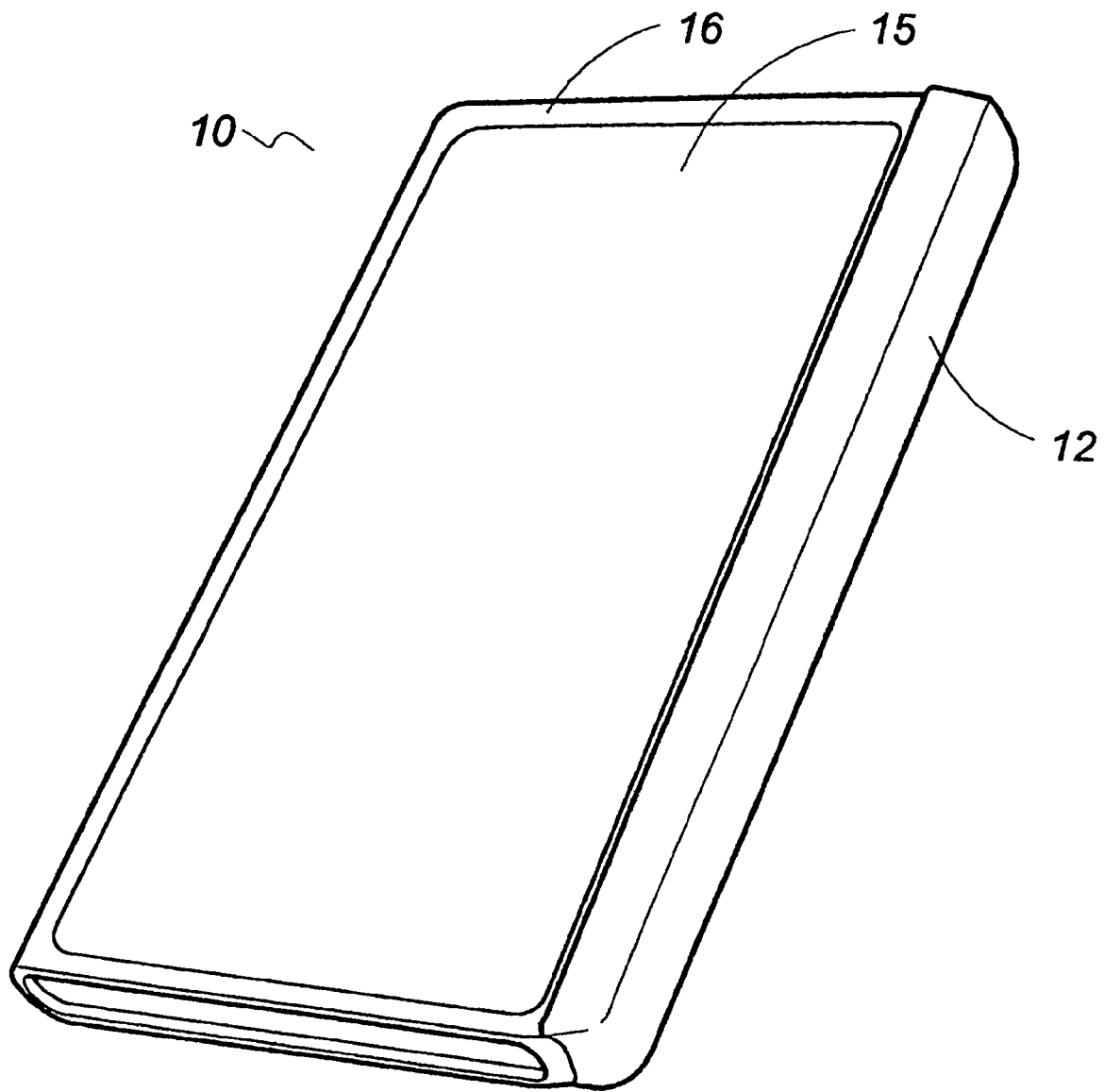
FIG. 1 depicts a typical mobile device.

Turning now to the drawing figures, FIG. 1 depicts a typical mobile device. The mobile device 10 includes a mobile device housing 12 having a top surface 16. A user interface, which may include, for example, a touch surface 15, is mounted in the top surface 16 of the mobile device housing 12. There are many types of mobile devices that could be used with the present invention, such as cellular telephones, personal digital assistants (PDAs), two-way pagers, data-enabled telephones, digital communicators, etc. These types of mobile devices all have some type of user interface that needs to be protected. The user interface of such mobile devices may include a touch surface 15, such as shown in FIG. 1, and may also include a display screen, a touch screen, a touch keypad, a keyboard, etc. Example mobile devices that may be used with the technology described in this application are set forth in co-pending and commonly-assigned U.S. application Ser. Nos. 09/344,432, 09/543,231, 09/634,774, 09/663,972, and 29/130,854, and 29/132,208. The entire disclosure of each of these co-pending and commonly-assigned applications, including the drawing figures, is hereby incorporated into the present application by reference.

FIG. 2 depicts the typical mobile device 10 of FIG. 1 configured with a protective user interface cover 20 according to one embodiment of the present invention. The protective cover 20 shown in FIG. 2 includes a protective surface comprising a top surface 21 and a bottom surface 22, as illustrated in the cross-sectional view along A-A. The protective cover 20 also includes a positioning mechanism 24, comprising pins 24 on either side of the protective surface, which co-operate with a rail mechanism 14 on either of the sides of the mobile device housing 12. The combination of the pins 24 and the rails 14 provide a hinge mechanism that can be used to alter the position of the protective user interface cover 20 between at least a first position (as shown in FIG. 2), in which the protective surface covers the user interface 15 mounted in the top surface 16 of the mobile device 10, and a second position (see, FIG. 5), in which the protective surface does not cover the user interface 15.

Also shown in FIG. 2 is a raised member 23 on the protective user interface cover 20, which is used to raise and lower the protective surface 20, 21 from the first position to at least the second position. Although FIG. 2 shows pins/ rails used as the positioning mechanism, it should be clear that other forms of mechanical elements could be substituted for pins/rails and achieve the equivalent function of providing a way to alter the position of the protective user interface cover 20 without detaching or removing the cover 20 from the mobile device 10.

FIG. 3 depicts the typical mobile device of FIG. 1 configured with a protective user interface cover 20 according to a second embodiment of the present invention. The protective user interface cover 20 shown in FIG. 3 is similar to that shown in FIG. 2, except that the cover in FIG. 3 includes a plurality of apertures 27. Each aperture 27 extends through the protective surface 20/21 of the user interface cover as shown in the cross-section view along A-A. The plurality of apertures 27 enable a user of the mobile device to input and operate the mobile device without removing or altering the position of the protective user interface cover 20. User input through the apertures 27 is received on the touch surface 15, or some other form of input device via a user extending a pointing device, such as a pen, a stylus, or a finger, through at least one of the plurality of apertures and making contact with the user interface below the cover 20. In this manner, a user can enter information and operate the mobile device 10 while the protective element 20 continues to provide protection for the at least a portion of the user interface.

The mobile device 10 can be configured such that a plurality of controls are positioned below the plurality of apertures 27 of the protective user interface cover 20. These controls could be visible to a user of the device through the apertures 27. In another embodiment, the mobile device 10 could be configured to be used with a plurality of different user interface covers 20, such as covers having a different number or configuration of apertures 27. These are referred to herein as cover models. For each cover model, the mobile device could implement a different set of controls. The user interface covers 20 would then be detachably mounted to the mobile device housing 12 so that they could be interchanged with ease.

FIG. 4 depicts the typical mobile device of FIG. 1 configured with a protective user interface cover 20 according to a third embodiment of the present invention. This protective cover is similar to that shown in FIG. 3, except that the entire protective surface is transparent, thus revealing the touch surface 15, which could be a touch screen display, below the protective cover 20. Alternatively, only a portion of the protective cover 20 may be transparent, depending upon the configuration of the user interface of the mobile device 10. This type of protective cover 20 provides for user input (via the apertures 27) and display of information (via the transparent surface). Although this embodiment is preferably used with a touch screen as the user interface, it could also be used with a graphic or LED surrounding a touch pad, keyboard, or other type of input device.

Figure 5A:
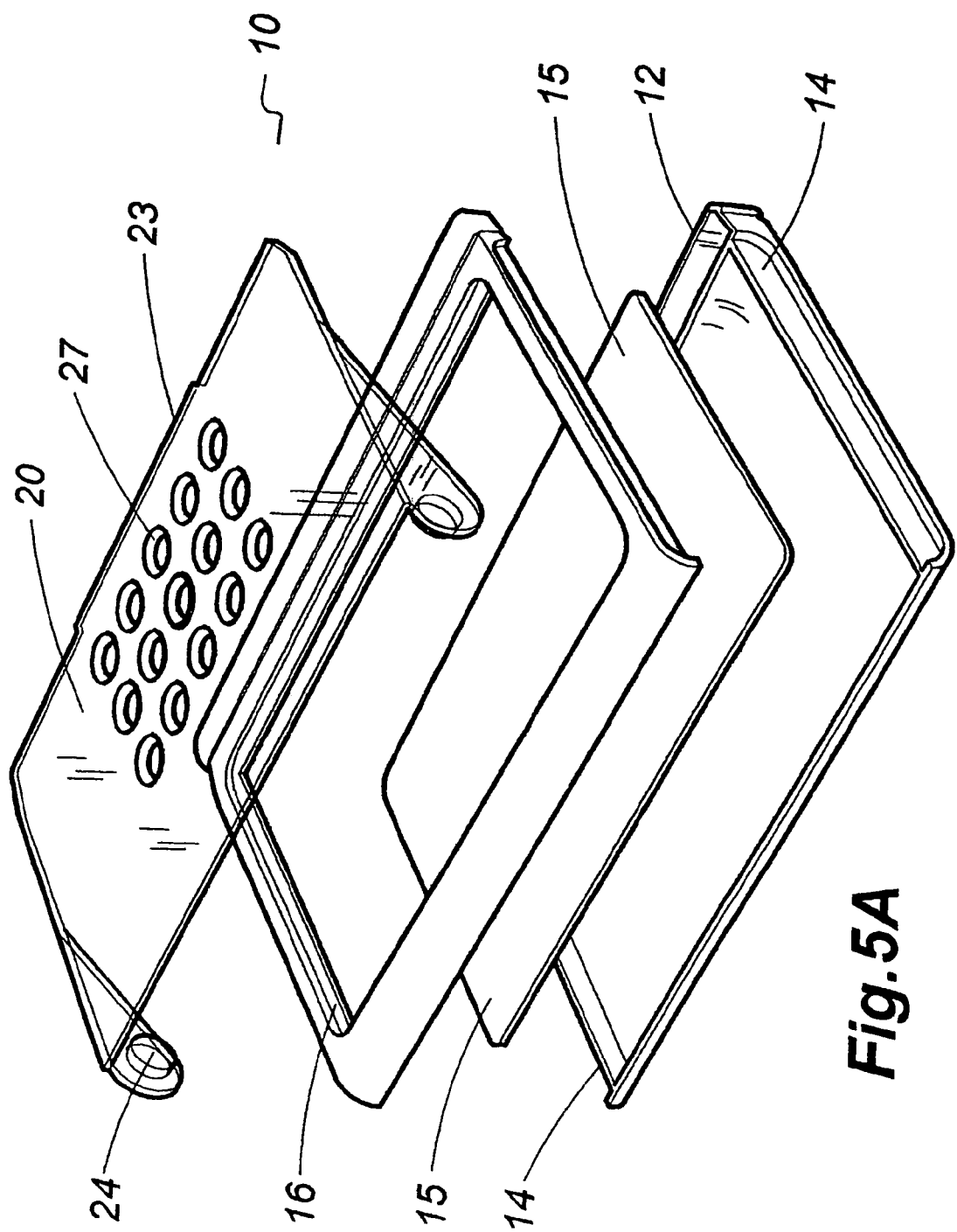
FIG. 5A is an exploded view of the mobile device with protective user interface cover shown in FIG. 4.
Figure 5B:
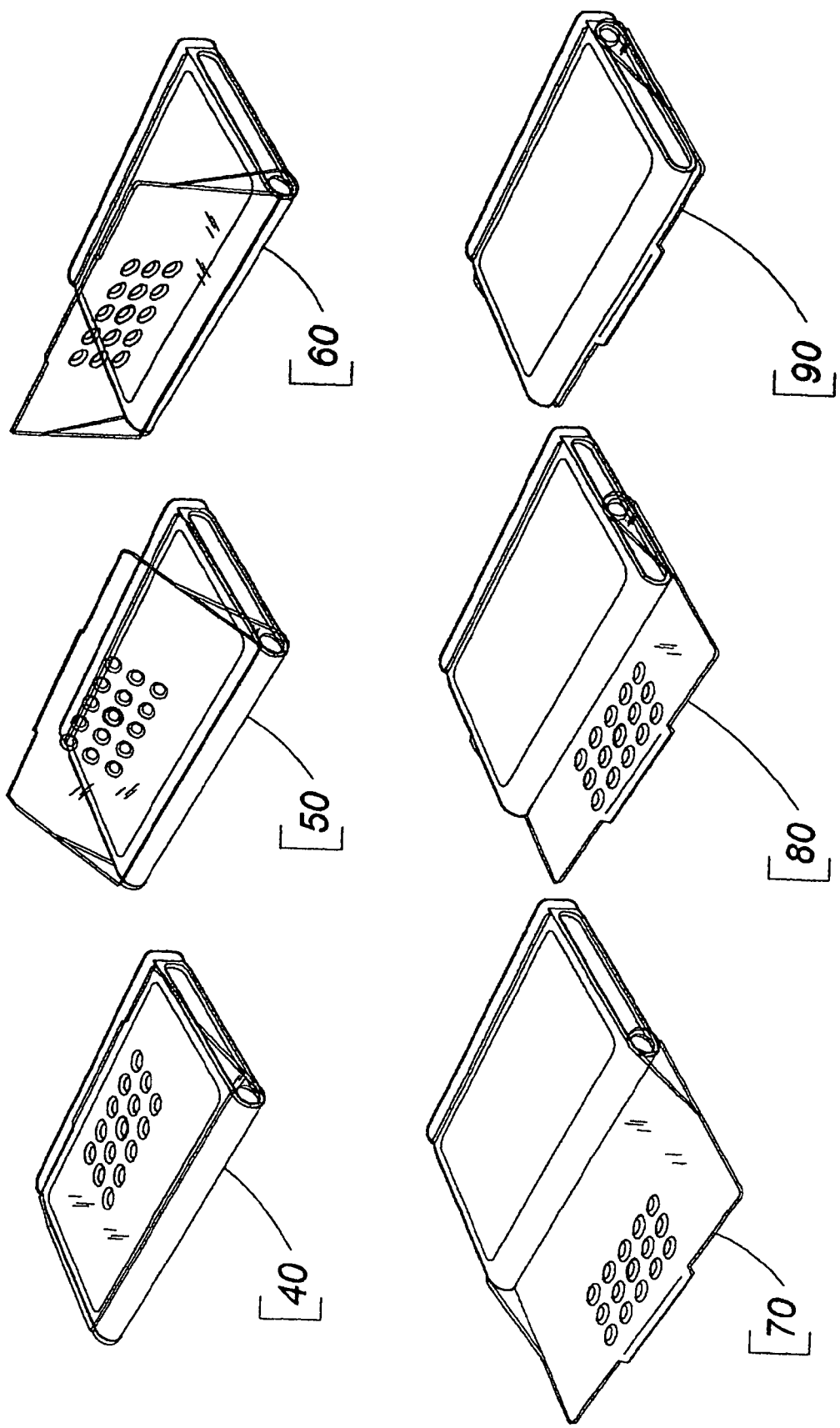
FIG. 5B demonstrates the positioning of the protective user interface cover on the mobile device shown in FIG. 5A in which the protective user interface cover is positioned between a first position and a second position.
Figure 5C:
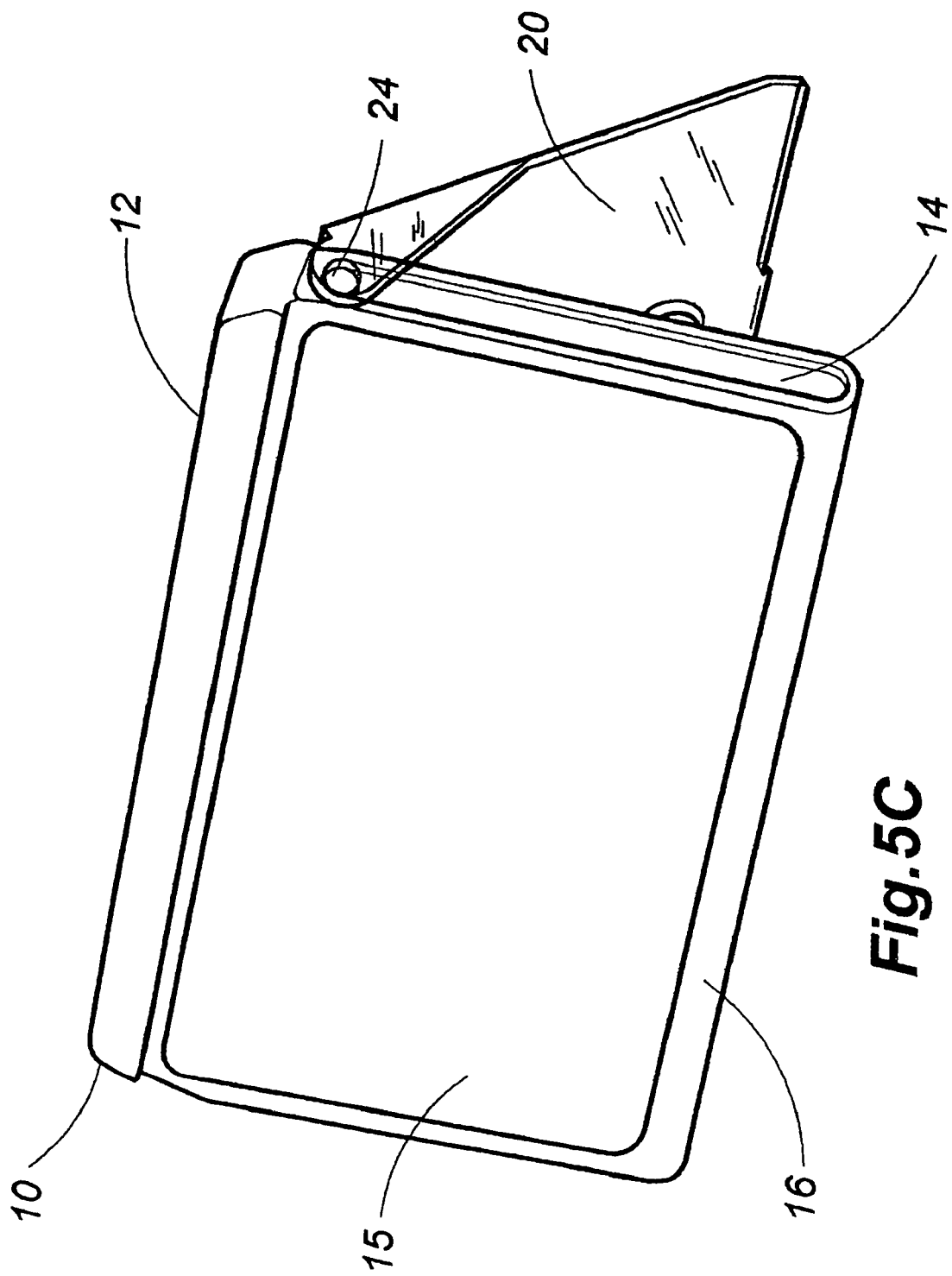
FIG. 5C depicts the mobile device shown in FIG. 5A in which the protective user interface cover is positioned in a third position where the user interface cover is configured to support the mobile device.

FIG. 5A is an exploded view of the mobile device 10 with protective user interface cover 20 shown in FIG. 4. This view shows how the top surface 16 of the mobile device 10 co-operates with the body of the mobile device housing 12 in order to mount the user interface 15, and also to provide the rails 14 that provide part of the preferred mounting mechanism. The remainder of the mounting mechanism is provided in the cover 20 as the pins 24, which engage the rails 14 of the mobile device housing 12 in a releasable and rotatable manner so that the protective user interface cover 20 can be: (a) removed from the mobile device if necessary; and (b) positioned between at least a first position in which the protective surface covers the user interface and a second position in which the protective surface does not cover the user interface. As shown in FIGS. 5B and 5C, the protective cover can also be rotated and repositioned in a third position (FIG. 5B) in which the cover can be used as a support mechanism for the mobile device 10, and a fourth position (FIG. 5C, view 90), in which the protective user interface cover 20 is in a stowed position under the mobile device 10.

FIG. 5B demonstrates the positioning of the protective user interface cover 20 on the mobile device shown in FIG. 5A in which the protective user interface cover 20 is positioned between a first position and a second position. In the first position 40, the protective surface of the user interface cover is covering the user interface 15. In the second position 90, the protective surface is displaced away from the user interface 15, and has been stowed beneath the housing of the mobile device 10. This stowage is accomplished, as shown in intermediate positions 50, 60, 70, and 80 by rotating the protective cover back using the pins 24, and then by sliding the cover 20 along the rails 14 in the mobile device housing 12.

As described previously, and as depicted in the drawings, the preferred positioning mechanism is a combination of pins 24 on the protective cover 20 and rails 14 on the mobile device 10. The pins 24 are used to releasably attach the protective cover 20 to the rails 14 on the mobile device 10. Rotation of the protective cover 20 about the pins 24 as well as translation of the protective cover 20 on the rails 14 allows the positioning of the protective cover 20 to a plurality of positions, comprising, at least the first and second positions. The pins/rails provide a hinge and translation mechanism. Other forms of mechanical positioning structures may also be utilized to achieve the function of positioning the protective user interface cover 20 in at least two positions, without removing the cover 20 from the mobile device 10.

FIG. 5C depicts the mobile device shown in FIG. 5A in which the protective user interface cover is positioned in a third position where the user interface cover is configured to support the mobile device. This position is useful for rendering the mobile device temporarily immobile. For instance, this third position is ideal for viewing information displayed on the mobile device when it is propped up on a flat surface, such as a table or a desk. This is particularly desirable for a mobile device when it is displaying multimedia information, such as images or video.

Figure 6:
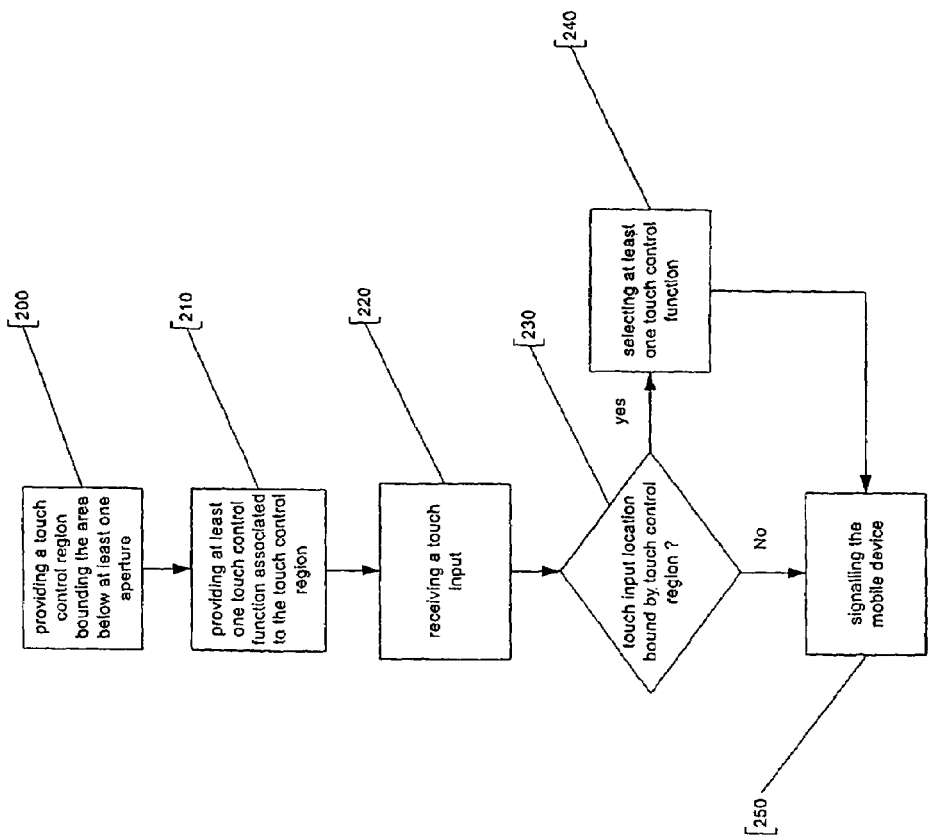
FIG. 6 is a flowchart describing a method of user input with a mobile device having a protective user interface cover and a touch screen.

FIG. 6 is a flowchart describing a method of user input with a mobile device having a protective user interface cover and a touch screen. At step 200, the mobile device 10 provides at least one touch control region on the touch screen 15, wherein the touch control region corresponds to a particular input command, and is situated on the touch screen 15 below one of the apertures 27 in the protective user interface cover 20. For example, the touch control region could be a touch key, or a touch keypad, or a touch keyboard, or a keyboard, or some other type of touch pointing control. In addition, the touch control region could include a graphic or label that is displayed on the touch screen, and which may be visible through the aperture 27, or through the cover 20 if the cover is transparent.

Having provided a touch control region, in step 210, at least one touch control function is provided, and is programmed into the mobile device 10, which corresponds with the provided touch control region. For example, a touch control function could be a touch key control function, a touch keypad control function, a touch keyboard control function, a touch pointing control function, etc. When a user touches the touch control region in step 220, the provided touch control function signals the mobile device 10 that a key down event occurred in a similar manner to how a discrete key would function. In step 230, the location of the touch input from the user is compared to the one or more touch control regions on the touch screen. If the location of the touch input is bound by one of the touch control regions, then the associated touch control function is selected in step 240. Bounding rectangles or similar types of structures can be used to determine if the touch input is in a particular region. At step 250, the mobile device is signalled accordingly, and the appropriate control function is executed.

Figure 7:
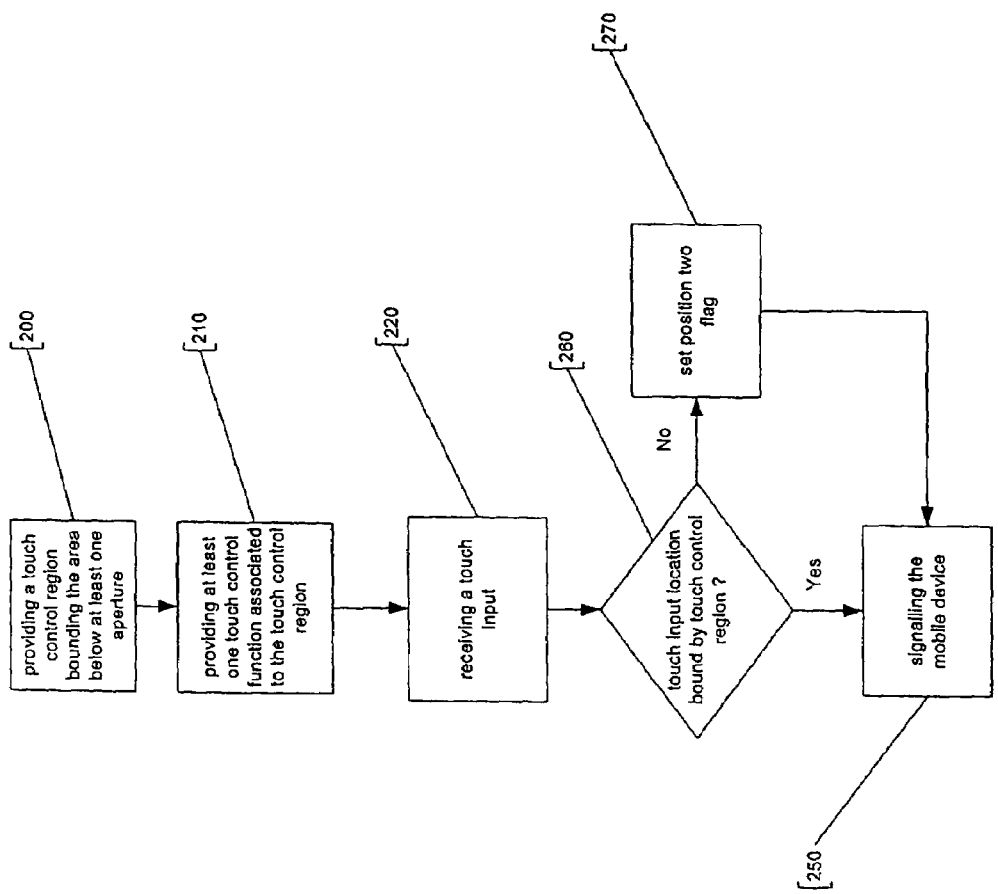
FIG. 7 is a flowchart describing a method of adapting a mobile device touch screen as a function of the positioning of the protective user interface cover.

FIG. 7 is a flowchart describing a method of adapting a mobile device touch screen as a function of the positioning of the protective user interface cover. This method is similar to the method of FIG. 6, except that steps 230-240 of FIG. 6 are replaced with steps 260-270. In step 260, the touch input location from step 220 is compared to the touch control region. If the touch control region does not bound the location of the touch input, then at step 270 an alternative position flag is set, and the display can be altered to reflect the presence or absence of the protecting user interface cover over the user interface.

For example, the touch screen on the mobile device may be partitioned so that one portion of the screen comprises a control portion and another portion of the screen comprises a display portion. If the protective user interface cover 10 is moved into the second position, away from the user interface, then this action may be sensed by the mobile device 10, which may then alter the partitioning of the touch screen display so that more or less of the screen is used for display or control. Thus, the method of FIG. 7 provides a mechanism for reacting to the changing boundary regions depending upon whether the protective user interface cover 20 is in a first position where the protective surface covers the user interface or a second position where the protective surface does not cover the user interface.

FIG. 8 is a flowchart describing a method of adapting a mobile device having a touch surface for use with a plurality of detachable and interchangeable protective user interface covers. The first step 300 is providing a cover model to the mobile device 10. The cover model describes the characteristics of a corresponding protective user interface cover 20. For instance, the cover model may contain the position and size of projections of the apertures onto the touch surface when the protective cover is in the first position. In addition, it is contemplated that the mobile device 10 could be used with multiple protective covers 20, and thus may require multiple cover models that would instruct the mobile device 10 how to create the bounding regions and how to respond to various touch input signals.

The second step 310 of this method is receiving a touch input. The third step 320 is comparing the touch input to the cover model in order to determine if there is a correspondence that would cause the mobile device 10 to execute some function. For example, the location of the touch input could be compared to the position of the projection of the apertures in the cover model. If there is a correspondence, the cover model is selected at step 330. The final step 340 is signalling the mobile device.

Having described in detail the preferred embodiments of the present invention, including the preferred methods of operation, it is to be understood that this operation could be carried out with different elements and steps. This preferred embodiment is presented only by way of example and is not meant to limit the scope of the present invention, which is defined by the following claims.

I claim:

1. A mobile device, comprising:
a housing having a top surface and a bottom surface;
a cover comprising a protective surface and a positioning mechanism, wherein the positioning mechanism positions the protective surface between a first position in which the protective surface covers at least a portion of a user interface in the top surface of the mobile device housing, a second position in which the protective surface supports the mobile device, and a third position in which the protective surface is at least partly adjacent to the bottom surface of the mobile device housing.

2. The mobile device of claim 1, wherein at least a portion of the protective surface is transparent to enable viewing of the user interface while the protective cover is in the first position.

3. The mobile device of claim 1, wherein the protective surface includes a plurality of apertures, and wherein a plurality of controls are selectable on the user interface through the apertures.

4. The mobile device of claim 1, wherein the positioning mechanism includes a pair of pins on the cover that mount to a pair of rails on the housing.

5. The mobile device of claim 3, wherein the pins rotate about the rails in order to position the protective surface between the first, second and third positions.

6. The mobile device of claim 1, wherein the mobile device is a cellular telephone, a two-way pager, or a personal digital assistant.

7. The mobile device of claim 1, wherein the positioning mechanism comprises a hinge.

8. The mobile device of claim 7, wherein the comprises a first part integral to the protective cover and a second part integral to the housing.

9. The mobile device of claim 1, wherein the user interface comprises a keyboard, and wherein the cover extends over the keyboard when in the first position.

10. The mobile device of claim 1, wherein the user interface comprises a touch screen.

11. A mobile device, comprising:
a housing having a top surface and a bottom surface; and
a cover comprising a surface and a positioning mechanism, wherein the cover is mounted to the housing such that the positioning mechanism positions the protective surface between a first position in which the protective surface covers at least a portion of a user interface of the mobile device, and a second position in which the protective surface is at least partly adjacent to the bottom surface of the mobile device;
wherein the cover includes a plurality of apertures for providing input commands to the user interface while the cover is biased in the first position.

12. The mobile device of claim 11, wherein the positioning mechanism including a pair of pins configured on the cover that mount to and engage with a pair of rails integral to and extending substantially along the sides of the housing, wherein the pins rotate about the rails and slidably engage therewith in order to translate the cover between the first position and the second position.

13. The mobile device of claim 11, wherein the user interface includes a touch screen.

14. The mobile device of claim 11, wherein the protective surface is at least partially transparent.

15. The mobile device of claim 11, wherein the user interface includes a keyboard.

16. The mobile device of claim 11, wherein the user interface comprises a touch control area and a display area, wherein the plurality of apertures are aligned in the cover above the touch control area when the cover is in the first position.

17. A mobile device, comprising:
a housing;
a plurality of covers which may be detachably mounted to the mobile device, each of the covers including at least one aperture; and
a plurality of cover models stored within the mobile device, each cover model corresponding to one of the plurality of covers and describing the position of the at least one aperture within the cover, the cover models being selectable from a user interface of the mobile device.

18. The mobile device of claim 17, wherein a user of the mobile device physically attaches one of the plurality covers to the mobile device and then interacts with the user interface to select the cover model corresponding to the attached cover.

* * * * *

UNITED STATES PATENT AND TRADEMARK OFFICE
CERTIFICATE OF CORRECTION

PATENT NO. : 7,324,642 B2  Page 1 of 1
APPLICATION NO. : 11/701048
DATED : January 29, 2008
INVENTOR(S) : Pletikosa It is certified that error appears in the above-identified patent and that said Letters Patent is hereby corrected as shown below:

Column 6, line 33, please replace "wherein the comprises" with -- wherein the hinge comprises --

Signed and Sealed this

Seventeenth Day of August, 2010

David J. Kappos
*Director of the United States Patent and Trademark Office*